US008844299B2

(12) United States Patent (10) Patent No.: US 8,844,299 B2
Ferreira et al. (45) Date of Patent: Sep. 30, 2014

(54) SYSTEMS AND METHODS FOR POTABLE WATER PRODUCTION

(75) Inventors: Wayne Ferreira, Lafayette, CA (US); Henri-James Tieleman, Miami, FL (US)

(73) Assignee: Ecoloblue, Inc., Miami, FL (US)

( * ) Notice: Subject to any disclaimer, the term of this patent is extended or adjusted under 35 U.S.C. 154(b) by 0 days.

(21) Appl. No.: 14/004,619

(22) PCT Filed: Mar. 4, 2012

(86) PCT No.: PCT/IB2012/051015
§ 371 (c)(1),
(2), (4) Date: Dec. 31, 2013

(87) PCT Pub. No.: WO2012/123849
PCT Pub. Date: Sep. 20, 2012

(65) Prior Publication Data
US 2014/0053580 A1 Feb. 27, 2014

Related U.S. Application Data

(60) Provisional application No. 61/451,994, filed on Mar. 11, 2011, provisional application No. 61/453,043, filed on Mar. 15, 2011.

(51) Int. Cl.
| | | |
|---|---|---|
| *F25B 41/00* | (2006.01) | |
| *F25D 21/02* | (2006.01) | |
| *F25D 21/06* | (2006.01) | |
| *F25D 17/04* | (2006.01) | |
| *F25D 21/14* | (2006.01) | |
| *C02F 1/18* | (2006.01) | |
| *E03B 3/28* | (2006.01) | |
| *B01D 5/00* | (2006.01) | |
| *C02F 1/44* | (2006.01) | |
| *C02F 1/42* | (2006.01) | |
| *C02F 1/28* | (2006.01) | |
| *C02F 1/76* | (2006.01) | |
| *C02F 1/22* | (2006.01) | |
| *C02F 103/00* | (2006.01) | |
| *C02F 1/00* | (2006.01) | |
| *C02F 1/02* | (2006.01) | |
| *C02F 1/78* | (2006.01) | |
| *C02F 1/32* | (2006.01) | |

(52) U.S. Cl.
CPC . *E03B 3/28* (2013.01); *C02F 1/444* (2013.01); *C02F 2209/005* (2013.01); *C02F 1/18* (2013.01); *C02F 1/42* (2013.01); *C02F 1/281* (2013.01); *C02F 1/76* (2013.01); *C02F 2201/009* (2013.01); *C02F 1/441* (2013.01); *C02F 2201/008* (2013.01); *C02F 1/283* (2013.01); *C02F 1/22* (2013.01); *B01D 5/0033* (2013.01); *C02F 2103/002* (2013.01); *C02F 1/001* (2013.01); *C02F 1/02* (2013.01); *C02F 1/78* (2013.01); *C02F 1/32* (2013.01)
USPC .................. 62/81; 62/140; 62/151; 62/176.2; 62/291

(58) Field of Classification Search
CPC .. E03B 3/28; F25B 2347/021; F25B 2700/11; F25B 47/022; F25B 47/025; F25D 21/04; F25D 21/14; F25D 21/02; F25D 21/008; F25D 2321/14; F25D 2321/1412
USPC ............... 62/80, 81, 140, 291, 428, 138, 151, 62/155, 176.2, 176.3, 228.1, 277, 285
See application file for complete search history.

(56) References Cited

U.S. PATENT DOCUMENTS 5,566,555 A 10/1996 Hewitt
2004/0168451 A1* 9/2004 Bagley .......................... 62/196.4
(Continued)

FOREIGN PATENT DOCUMENTS

JP 2009-503293 A 1/2009
KR 10-2000-0014834 A 3/2000
(Continued)

OTHER PUBLICATIONS

International Search Report in PCT application No. PCT/IB2012/051015 dated Nov. 1, 2012 (3 pages).
Written Opinion of the International Searching Authority in PCT application No. PCT/IB2012/051015 dated Nov. 1, 2012 (6 pages).

*Primary Examiner* — Mohammad M Ali
*Assistant Examiner* — Christopher R Zerphey
(74) *Attorney, Agent, or Firm* — Aileen Law; Oppedahl Patent Law Firm LLC

(57) ABSTRACT

Systems and methods are disclosed for water collection from atmospheric moisture in large quantities in uncontrolled outdoor environments where the temperature may be cold and humidity levels low. To extract water from air when the dew point is low, a heat exchanger cools to a point where water vapor is deposited on its surface as ice. The heat exchanger then cycles through a heating phase to melt the ice and generate liquid water. The accumulation of frost is advantageous. Frost accumulation enables water collection when the dew point is low. Disclosed variations enhance efficiency and environmental tolerance.

15 Claims, 7 Drawing Sheets

(56) References Cited

U.S. PATENT DOCUMENTS

2010/0266742 A1   10/2010   Ferreira
2011/0048038 A1*  3/2011    Merritt et al. ..................... 62/93

FOREIGN PATENT DOCUMENTS

| KR | 10-2001-0041407 A | 5/2001 |
| KR | 10-0937906 B1 | 1/2010 |

* cited by examiner

SYSTEMS AND METHODS FOR POTABLE WATER PRODUCTION

BACKGROUND

The need for water is universal. In many places, reliable sources of clean water are insufficient to meet human needs. The lack of clean water may be due to infrastructure damage, such as the damage to water supply systems caused by an earthquake or flood. The lack of clean water may also be due to migration, such as population displacements into refugee camps during a war.

It is difficult to provide clean water quickly and efficiently. Water is heavy. It can be expensive to transport water to the areas that need it. Digging wells and building water treatment facilities requires time, energy, and equipment.

It is difficult to extract liquid water from humidity when the dew point is low.

There is a need for a system that can reliably and quickly provide clean water.

FIELD OF INVENTION

The field of invention relates to water production and purification, and more particularly to the generation of potable water from atmospheric humidity.

DESCRIPTION OF RELATED ART

The prior art discloses methods and systems for water collection from atmospheric moisture in small quantities in controlled indoor environments where the temperature is warm and humidity levels are moderate or high.

SUMMARY

The present application discloses systems and methods for water collection from atmospheric moisture in large quantities in uncontrolled outdoor environments where the temperature may be cold and humidity levels may be low.

Technical Problem

There are several challenges related to the production and purification of potable water from atmospheric moisture or surface water sources. It is difficult to provide a system that is mobile, easy to set up, modular, capable of functioning without infrastructure-provided water or power, sanitary, designed for multicultural use in its control interface, maintainable with minimal technical skills needed for routine maintenance, rugged enough for use outside when temperatures fluctuate, and capable of producing water from humidity when the dew point is low.

The following embodiments and aspects thereof are described and illustrated in conjunction with systems, tools, and methods which are meant to be exemplary and illustrative, not limiting in scope. In various embodiments, one or more of the above described problems have been reduced or eliminated, while other embodiments are directed to other improvements.

Technical Solution

Several technical solutions are disclosed to address the challenges relating to environmental tolerance, energy efficiency, ease of operation, transport considerations, and operation at low temperature and humidity levels.

The production of potable water for humans and livestock is often needed in outdoor areas. Environmental tolerance is important because the system may be installed outdoors or in facilities without environmental controls. Embodiments of the system are designed to withstand freezing temperatures and function in near-freezing cold. One the technical solutions includes the use of metal filter housings that resist cracking under the pressure exerted by water expansion when the water freezes or heats up.

Embodiments of the system can function outdoors where temperature fluctuations are common. To extract water from air when the dew point is low, the evaporator cools to a point where water vapor is deposited on its surface as ice. The evaporator then cycles through a heating phase to melt the ice and generate liquid water. The accumulation of frost is good. Frost accumulation enables water collection when the dew point is low. The dew point is often low when relative humidity levels are low. Relative humidity is the actual amount of humidity relative to the maximum amount of humidity possible at that same temperature and pressure. The dew point is also often low when air temperatures are low because cooler air does not hold as much moisture. Cycling through frosting and melting allows the system to collect water from ambient air with relative efficiency in conditions that would otherwise be adverse to water production through dehumidification.

Surface water may be contaminated with microbes, heavy metals, chemical byproducts of agriculture, and other contaminants. Through filtration and irradiation these contaminants may be neutralized or removed. Some disclosed embodiments use reverse osmosis, carbon filters, zeolite filters, ozone, and ultraviolet light to produce potable water for consumption.

Embodiments of the system are designed to be resistant to pest animals and insects. Screens cover air vents. Conduit and panels cover wires. Interior spaces are accessible to human inspection.

Energy efficiency is important because the system requires power to function. Power supplies may be limited. In one embodiment, a diesel generator is included. In another embodiment, solar panels are included. In another embodiment, the system uses a wind turbine for energy. In another embodiment power is provided by conventional electrical utility infrastructure. To conserve energy, a variable compressor is used. To further enhance efficiency, the fans are configured to optimize the air flow through the system. Sanitization may be accomplished with ozone, ultraviolet light, chemical addition, heat, microfiltration or combinations thereof. Gravity may assist the flow of liquid water through the filters. Pump activation can be controlled by the programmable logic controller (PLC). The PLC can regulate processes that require power. The PLC may be programmed to optimize energy consumption or to shift energy use from times of the day associated with peak energy consumption to off-peak times. Power optimizing or production optimizing settings may be preprogrammed.

The system may incorporate many features to facilitate use. The human-machine interface may offer multiple languages, allowing a user to select a language, it may also incorporate pictographic icons and touch-screen control. The PLC is designed for multiple inputs and outputs. The PLC is tolerant of extended temperature ranges, immune to electrical noise, and resistant to vibration and impact. Parts of the system requiring periodic replacement or manual adjustment are positioned accessibly.

To facilitate transport, embodiments of the water system are configured to fit into a standard shipping container or onto a standard truck bed. In one embodiment an integrated bottling system is disclosed to facilitate distribution of the water produced.

Advantageous Effects

The combination of features disclosed has the advantageous effect of providing a potable water generating system that can be transported, set up, and used with relative ease and with minimal infrastructure in a broad range of environments.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

Figure 1:
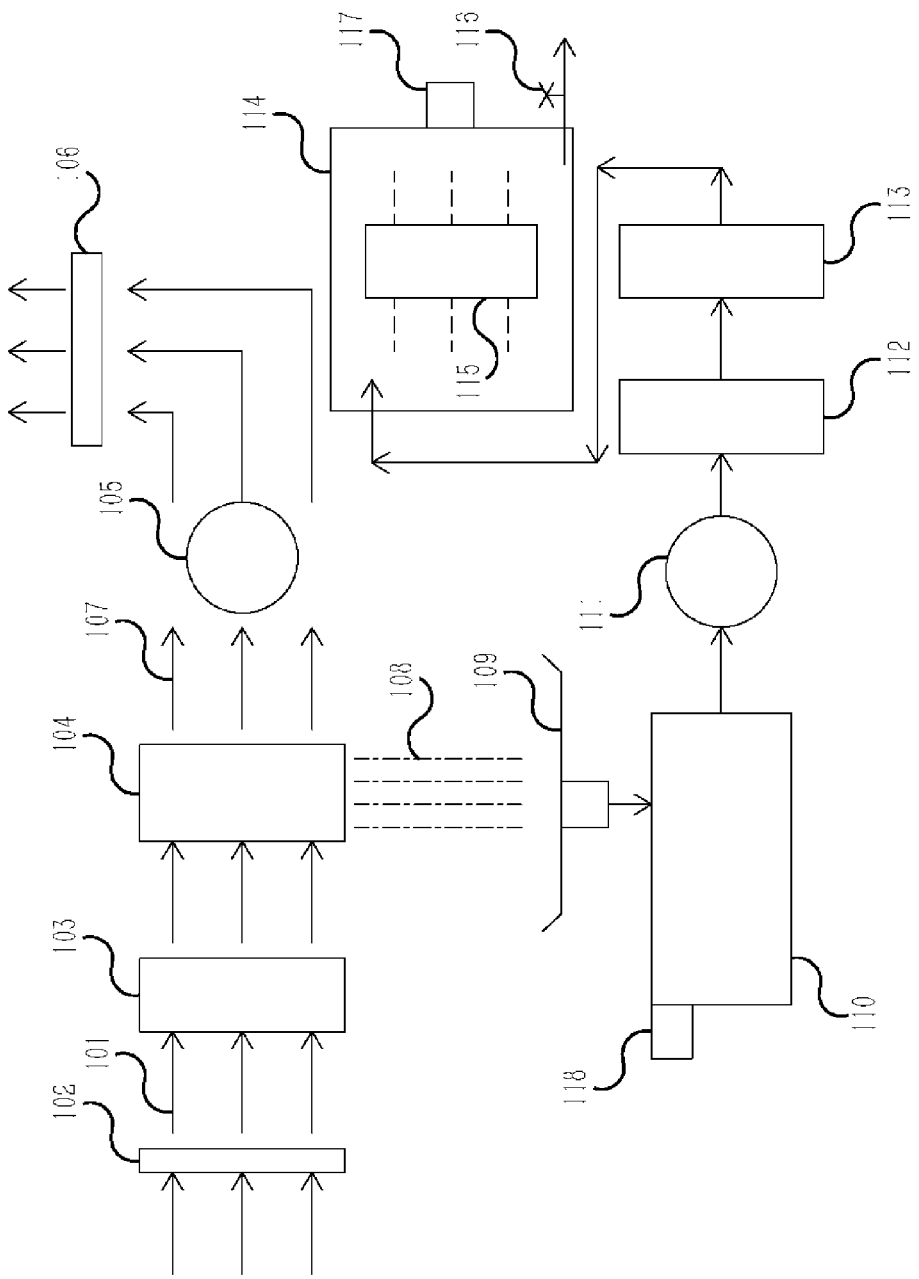
FIG. 1 shows a simplified air flow and water path through the system.
2.

FIG. 1 presents a simplified version of an embodiment showing air and water flow paths. Inflow air 101 enters through a particulate filter 102. It then passes by a condenser 103. The condenser 103 is hotter than the inflow air 101 and the air provides a cooling function on working fluid contained in the condenser 103. The air then passes the evaporator 104 which is cold. Condensate or frost forms on the evaporator 104. The fan unit 105 then blows the dehumidified air 107 out the air exit 106.

Unprocessed water 108 is collected in the water collector 109 and directed to the collection vessel 110. The collected water pump 111 pushes water through a first filter 112 and a second filter 113. Additional filters may be used to achieve the desired result. Many types of filters provide beneficial effect. For example: reverse osmosis filers, activated carbon filters, resin filters, ion exchange filters, adsorption filters, ultrafiltration membrane filters, microporous ceramic filters, zeolite filters, diatomaceous earth filters, and particulate filters.

After filtration, water enters the holding vessel 114. In the holding vessel 114, water safety may be facilitated by a sanitizing ultra violet (uv) device 115, an ozone device 117, or by the addition of chemicals such as chlorine compounds. Water may be drawn from the holding vessel 114 through a purified water outlet valve 116. If it is desired to use the system for filtration of available liquid water, the liquid water may be added to the system through an optional grey-water inlet 118.

Figure 2:
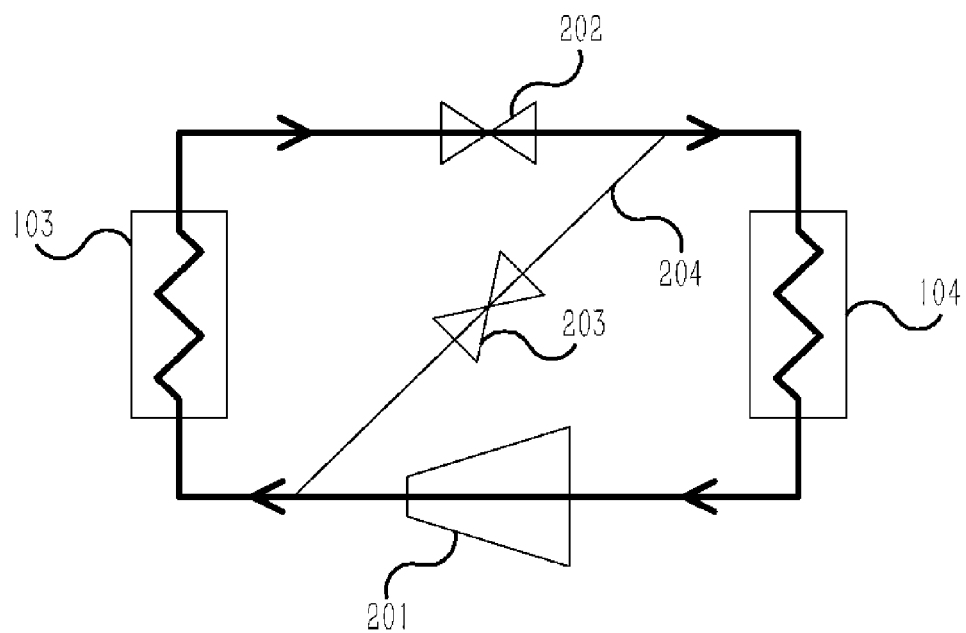
FIG. 2 shows a simplified refrigerant flow path in a frosting configuration.
3.
Figure 3:
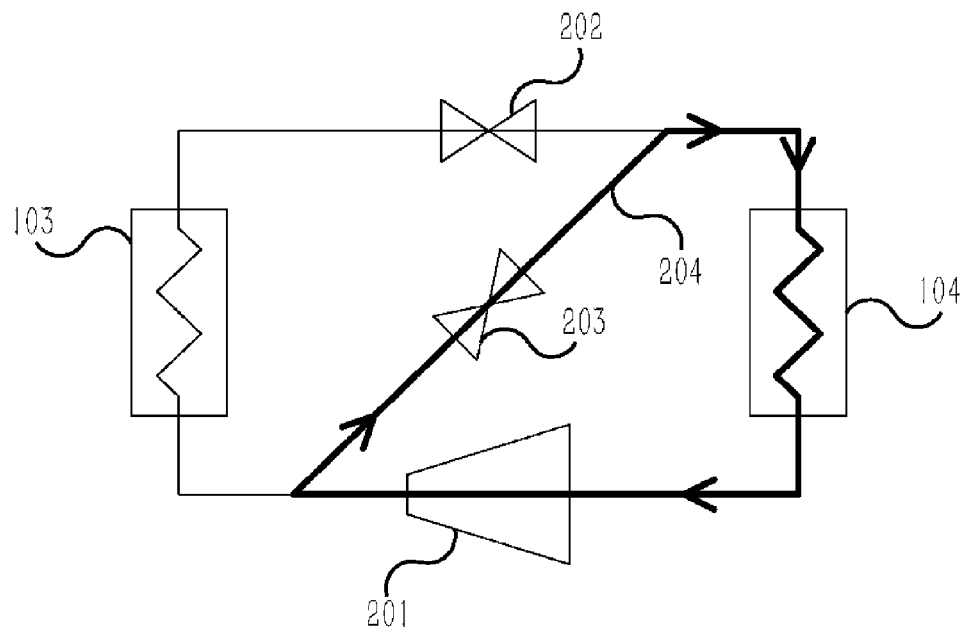
FIG. 3 shows a simplified refrigerant flow path in a defrosting configuration.
4.

FIGS. 2 and 3 show one embodiment in two configurations. FIG. 2 shows a simplified refrigerant flow path in a frosting configuration, while FIG. 3 shows a defrosting configuration. Working fluid, or refrigerant, is shown traveling in a loop. Thick lines with arrows show the flow path.

In FIG. 2, refrigerant flows through the evaporator 104, through the compressor 201, through the condenser 103, through an expansion device 202, and back through the evaporator 104. Fluid passing through the expansion device 202 expands as pressure is reduced. This expansion is generally accompanied by a phase change; the refrigerant goes from a liquid to a gas and it absorbs heat, cooling the exterior of the evaporator 104. In FIG. 2 the bypass valve 203 is closed and there is no flow through the bypass shunt 204.

In FIG. 3, the bypass valve 203 is open and refrigerant from the compressor 201 flows through the bypass shunt 204. Fluid exits the compressor 201 at a high temperature. The hot fluid passes through the bypass valve 203 and bypass shunt 204 relatively unchanged in pressure and temperature. Thus, it is hot when it enters the evaporator 104 and it melts ice that may have formed on the evaporator 104.

Figure 4:
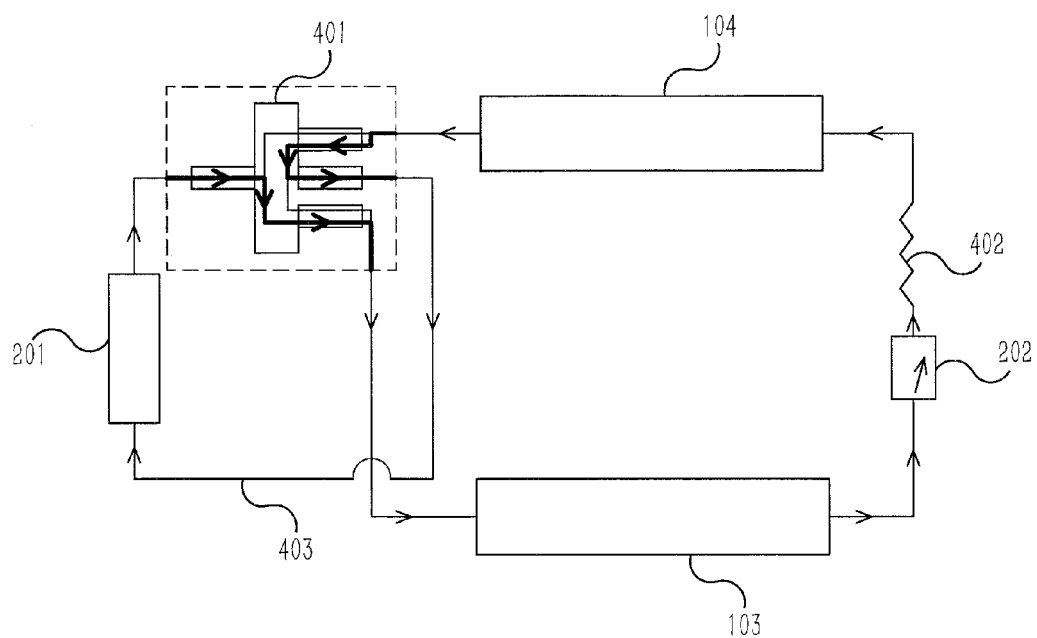
FIG. 4 shows an alternate simplified refrigerant flow path in a system where the functionality of the condenser and evaporator may be reversed.
5.
Figure 5:
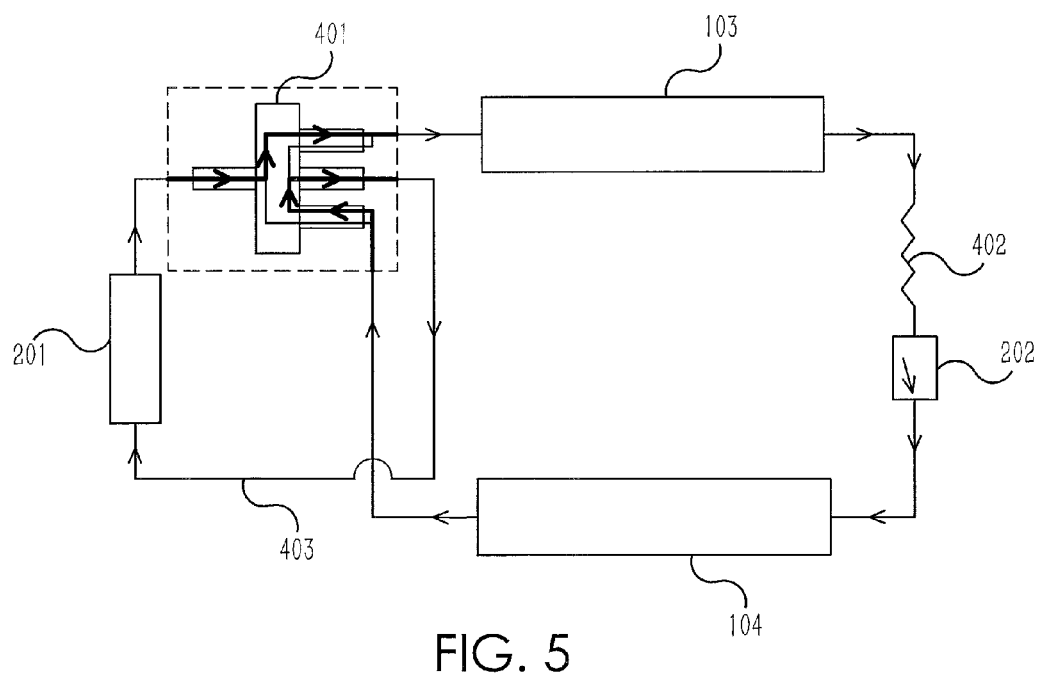
FIG. 5 shows an alternate simplified refrigerant flow path in a system where the functionality of the condenser and evaporator may be reversed.
6.

FIGS. 4 and 5 show an alternate simplified refrigerant flow path in a system where the functionality of the condenser and evaporator may be reversed. In this embodiment there is a flow-directing valve 401 shown here as a four-way valve. The expansion device 202 may incorporate one or more capillaries 402. The flow can be reversed so that the evaporator 104 and condenser 103 can switch function. The flow-directing valve 401 changes the flow path to do this. The flow-directing valve 401, shown here as a four-way valve, connects the compressor flow circuit 403 to the heat exchangers selectively determining the path of the working fluid.

Figure 6:
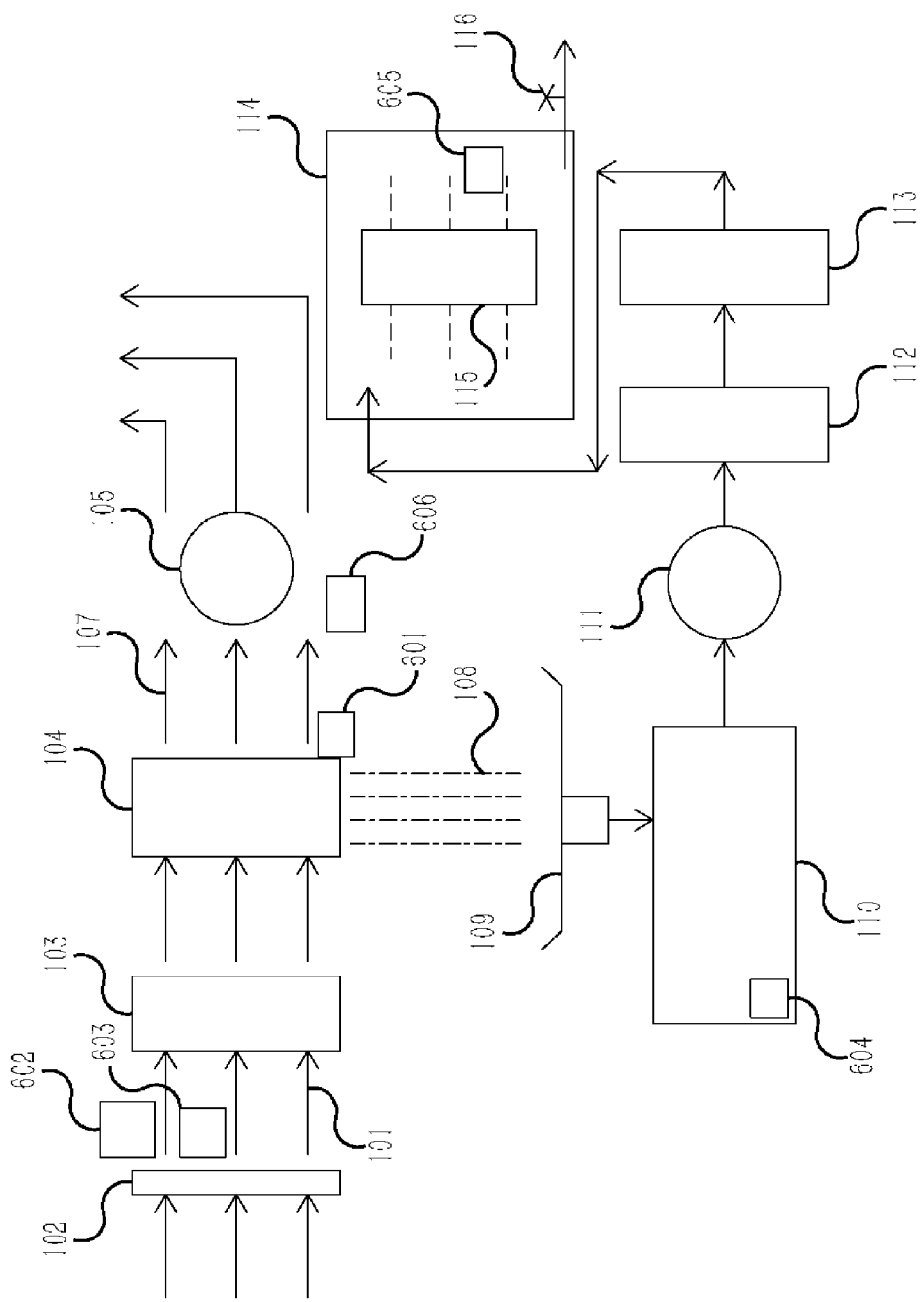
FIG. 6 shows the simplified system with additional sensors and control modules.
7.

FIG. 6 shows the simplified system of FIG. 1 with additional sensors and control modules. These include: a frost sensor 601, an intake humidity sensor 602, an intake temperature sensor 603, a collection vessel level sensor 604, a holding vessel level sensor 605, and a regulator or controller 606. Various controllers and/or regulators may take input from the optional sensors. The various controllers and regulators can control aspects of the system such as the evaporator temperature, the valves, the expansion device, the compressor speed, the fans 105, the collected water pump 111, and other aspects of the system as discussed hereinafter.

Figure 7:
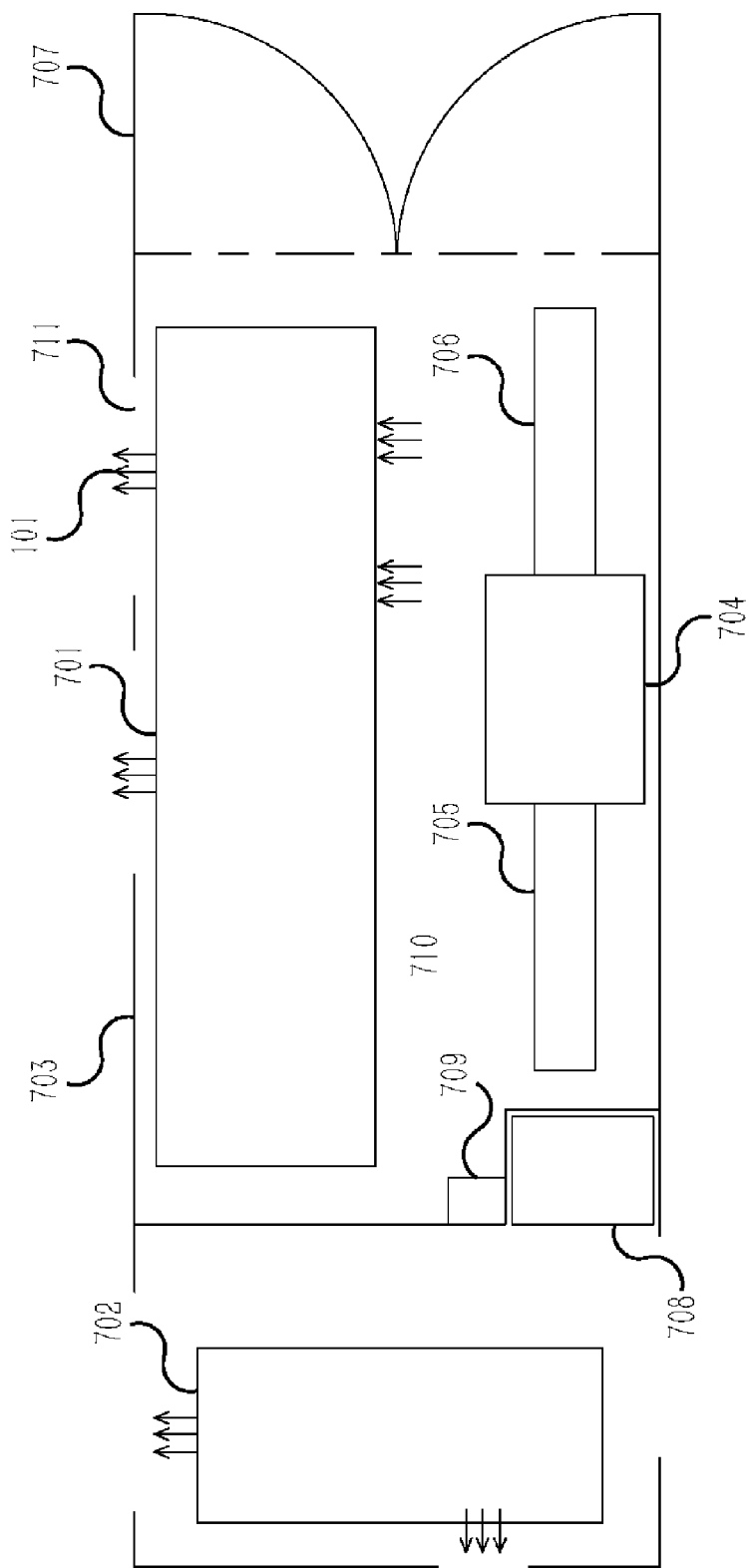
FIG. 7 shows an embodiment of the system with power generation, filtration, water storage, and bottling features incorporated.
8.

FIG. 7 shows an embodiment of the system with power generation, filtration, water storage, and bottling features incorporated within the bounds of a standard 20-foot freight container. The integrated system includes at least one atmospheric water unit 701, diesel generator 702, shipping container boundary wall 703 with apertures for air flow 711, and at least one door 707. The integrated unit may also comprise a water bottling, filling, and capping unit 704 having an input conveyor 705 and a bottle output conveyor 706. The fuel storage 708 is segregated from the airflow intake areas by one or more boundary walls 703 to avoid contamination by fumes. There is also an electrical control 709 and a maintenance passage 710.

Figure 8:
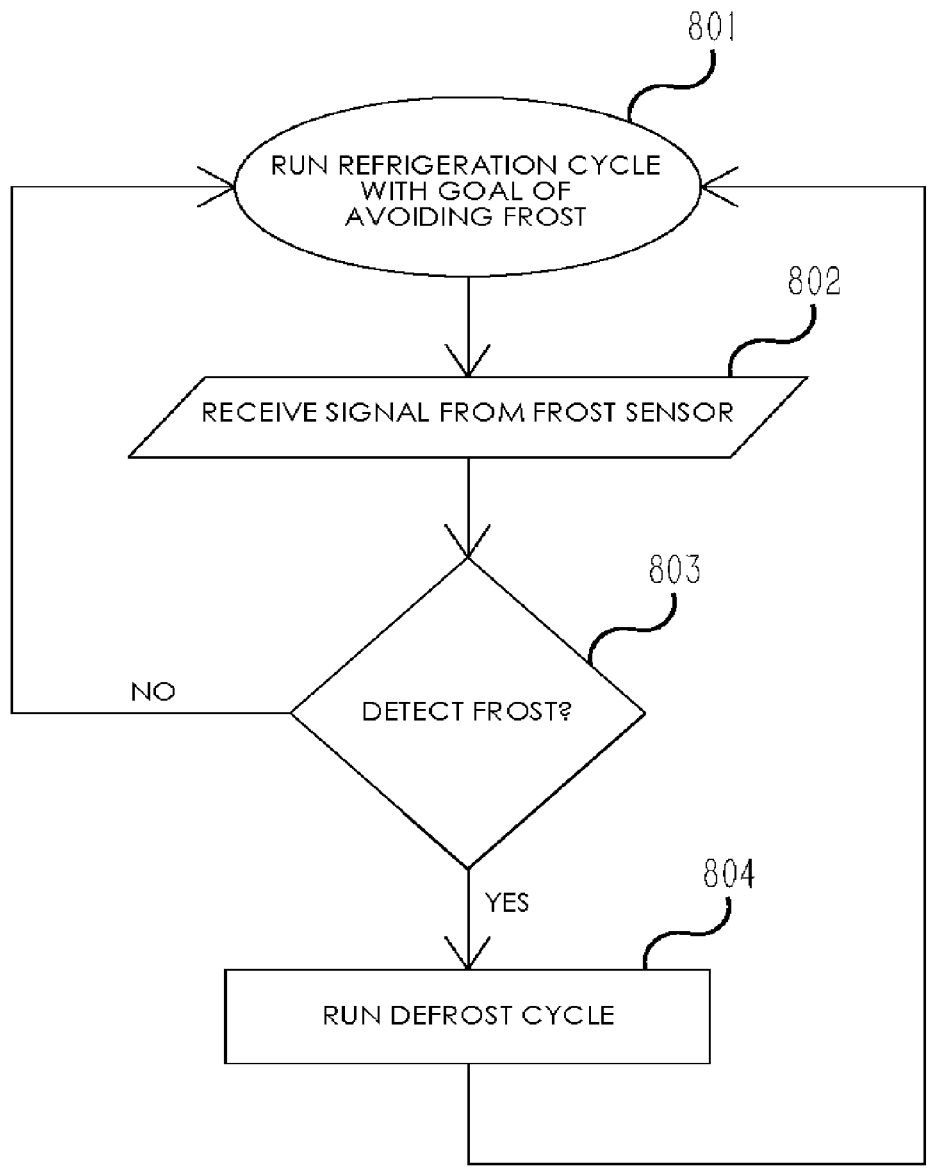
FIG. 8 is a flow chart showing a prior art method.
9.

FIG. 8 shows a prior art method for operating prior art atmospheric water generators. Analogous systems are known in the art of similar systems in the field of refrigeration and air conditioning. In these prior art systems, frost on the evaporator is not desired because frost may obstruct air flow. The prior art method shown in FIG. 8 begins with the prior art initiation step 801, a first input step is in the form of a frost sensor signal 802, a decision point of frost detection 803 follows. If frost is not detected the refrigeration continues or repeats. If frost is detected, the defrost cycle 804 is initiated.

Figure 9:
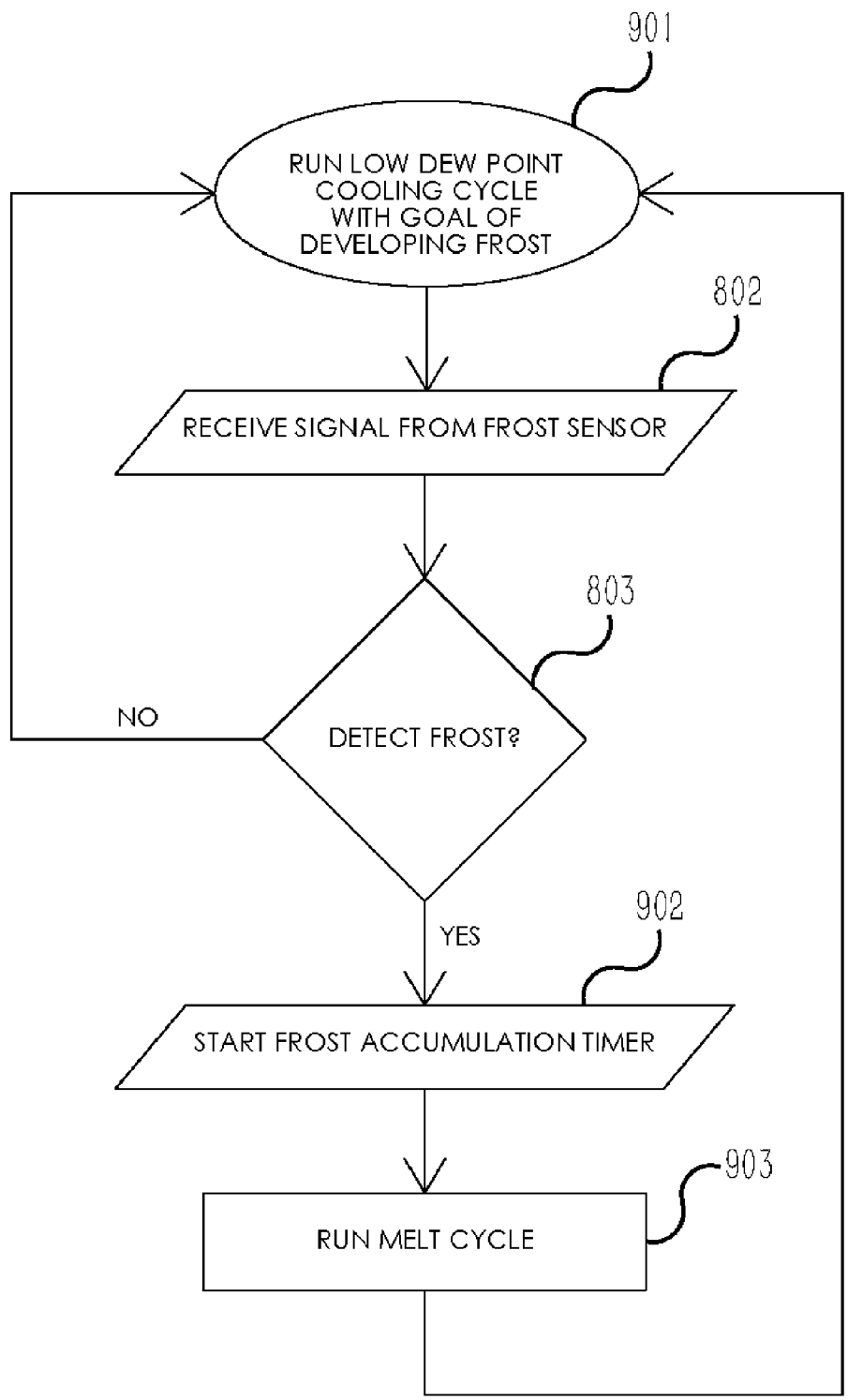
FIG. 9 is a flow chart showing one of the disclosed methods.

FIG. 9 shows one of the disclosed methods where frost is desired. It starts with a frost cycle initiation step 901, a first input step is in the form of a frost sensor signal 802, a decision point of frost detection 803 follows. If frost is not detected the cooling cycle continues or repeats. If frost is detected, the frost accumulation timer 902 starts, followed by the melt cycle 903. Melted frost is collected as water. The method steps may be repeated as many times as needed to collect the desired quantity of water.

Generally referring to FIGS. 1-9: Air flows into the system. It is dehumidified and then exits the system. In many embodiments, the air flows through a particulate filter, then past a condenser, then past an evaporator, then through the fan area, and finally exiting the system.

A compressor circulates refrigerant or working fluid through a condenser, through an expansion device such as an expansion valve or an adjustable capillary valve, and then through an evaporator, often configured as a finned evaporator coil. Expansion of the working fluid as it passes through the expansion valve into the evaporator results in a state change of the working fluid from a liquid to a gas and the working fluid absorbs heat, cooling the evaporator.

Air passing by the evaporator is cooled. This lowers the air temperature to or below its dew point, causing water to condense. If the evaporator temperature is sufficiently low, the air drops to or below the frost point, causing deposition of frost on the exterior surface of the evaporator. A fan pushes filtered air over the evaporator. Water is collected from the condensate that drips off of the evaporator or by melting the frost on the evaporator and collecting the melt-water. The resulting water is then passed into a holding tank and is further purified, filtered, and treated to produce potable water.

In many embodiments, the air flows first past the condenser coils and then past the evaporator coils. The condenser is hot. The air flow helps to cool the working fluid inside the condenser. Condenser fins also help dissipate heat. The air flowing past the evaporator is cooled. Evaporator fins provide a large surface area for condensation and frost deposition. In one embodiment, there are several capillary tubes directing refrigerant to multiple evaporator segments help to make the gas expand in the evaporator and make it cool more efficiently. Compound evaporators and condensers may be used, and fins on both aid in heat transfer.

The capillary and expansion valve function as expansion devices and can be combined. Both adjust the refrigerant pressure. One important difference is that the capillary capacity for adjusting the pressure is static and the expansion valve capacity is dynamic. Once a capillary is brazed in the system, its capacity is fixed by its length and inside diameter, those factors cannot be adjusted during operation. The expansion valve may have a variable aperture or it may be opened to a single fixed diameter in a series of pulses. Using a single open diameter, the valve is controlled by pulses in a similar principle as controlling a step motor. The expansion valve controls the evaporator temperature according to the detected environmental temperature and humidity, through the PLC program. The PLC sends a pulse to the expansion valve, with more pulse, the valve opens more; less pulse and the expansion valve opens less.

When the evaporator is very cold, frost accumulates on the exterior surface and fins of the evaporator. The flow path of working fluid is changed to defrost the evaporator. The flow path may have a bypass directly from the condenser routing hot working fluid through the evaporator. Alternately, the flow path through the system may be reversed. The frost is melted from the fins and then the cycle is restated. The evaporator is again cooled until frost forms. The cooling cycle continues so that more frost accumulates on the evaporator fins. The rate of frost accumulation may slow as the frost obstructs airflow. The valves then redirect warm working fluid through the evaporator and frost is melted and then the cooling cycle starts again.

To efficiently collect water from the humidity of air, the evaporator surface temperature must be 2~3° C. lower than the dew point or frost point. Dew point is related to environment temperature, humidity, and pressure. Generally, when the environment temperature is lower than 15° C. and the humidity is lower than 40%, the dew point is near, or lower than, 0° C. When the dew point or frost point nears 0° C., the evaporator surface temperature is reduced to near or below 0° C. Then, frost, rather than condensate forms on the evaporator. In many embodiments, one or more sensors are used to measure environment temperature and humidity. The approximate frost point or dew point is calculated and the evaporator temperature is adjusted accordingly to run in either the condensate mode or in the frost and defrost cycle mode.

In some embodiments, a sensor mounted on the evaporator to measures its surface temperature. If the temperature is lower than −2° C., the system will start defrosting automatically after a set period of time. The frost time may be set at approximately 30 minutes. At which point the frost thickness is thick enough and the system will start defrosting, melting the frost and generating water. In some embodiments the frost period may be shortened to as short as 5 minutes in response to higher humidity or lengthened to as long as two hours in response to lower humidity. In other embodiments, a sensor detects frost thickness and initiates the melting cycle. In embodiments that detect frost thickness, the melting cycle is initiated when the sensor detects a predetermined frost level. The frost level will generally be set at a frost thickness of at least 1 mm and less than one half of the distance between evaporator fins. In many embodiments, a desired range will be between 2 mm to 6 mm of frost.

In another embodiment, the condenser and evaporator may switch functionality by reversing the flow of refrigerant through the system. Both the condenser and evaporator are heat exchangers. Essentially the system is a loop: heat exchanger→compressor→other heat exchanger→expansion device, and back to the beginning. By selectively routing refrigerant from one of the heat exchangers to the compressor, and then to the other heat exchanger, using a four-way valve to switch the sequence, the system can melt ice from one heat exchanger while frosting or promoting condensate on the other.

The fans may be placed anywhere along the air flow path such that the fans perform either by sucking or by blowing air past the evaporator. A single fan or a large fan assembly may be used. In some embodiments, a tubular fan assembly promotes efficient air flow. The fans are arranged parallel to the evaporator with all fans in the assembly equidistant from the evaporator. The tubular fan is one kind of cross flow fan, which has a long and narrow shape, so it is relatively easy to mount, it sits close to the condenser surface, and several in parallel may be located to nearly-uniformly direct air past a large area of a heat exchanger. Other types and configurations of fans may be used including cross flow fans, centrifugal blowers, and axial flow fans.

Many embodiments of the system incorporate an integrated filtration system. Filtration may include reverse osmosis filters, carbon filters, resin filters, and particulate filters. Water processing may include remineralization, pH adjustment, chlorination, and fluoridation. The filtration system is fully optional for systems designed to provide water to livestock.

Some additional features may include carbonation for sparkling water, heated water, chilled water, and water with flavorings and nutrients. Flavorings and nutrients may include broth, tea, coffee, herbal extracts, minerals, and vitamins. Optional features may be included at or just prior to dispensing. Heating and chilling features may be efficiently designed to take advantage of the heat properties of the evaporator and condenser.

The system may incorporate a power generation unit, such as solar panels, a wind turbine, or a diesel generator. The system may include a bottling feature. Some embodiments are designed to be self-contained units within a standard size shipping container. These embodiments are particularly useful for quickly responding to a humanitarian crisis because they are self-contained and require minimal set-up. They also require no water or power infrastructure.

Some embodiments may produce potable water from either atmospheric moisture or by filtering available liquid water sources. Such sources may include, grey-water, surface water such as that from lakes or streams, and compromised municipal water. These dual-use systems utilize the same filtration system. These dual input systems are designed to permit addition of liquid water into the collection vessel.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and sub-ranges, as well as all individual values included in the ranges given are intended to be included in the disclosure. When a Markush group or other grouping is used herein, all individual members of the group and all combinations and sub-combinations possible of the group are intended to be individually included in the disclosure.

The invention claimed is:

1. A system for collecting atmospheric moisture comprising:
   a compressor to compress a refrigerant;
   a condenser disposed along a refrigerant flow path, receiving high pressure gaseous refrigerant from the compressor, wherein the high pressure gaseous refrigerant condenses into a low pressure liquid refrigerant and releases heat, the refrigerant moving along the flow path;
   an expansion device comprising an expansion valve and capillary device disposed along the refrigerant flow path, receiving liquid refrigerant from the condenser, wherein the expansion device adjusts a pressure of the refrigerant;
   an evaporator disposed along the refrigerant flow path, receiving refrigerant from the expansion device and delivering refrigerant to the compressor, wherein the liquid refrigerant evaporates into gas refrigerant and absorbs heat, whereby the external surface temperature of the evaporator is lower than the dew point but higher than 0° C., when the environment's temperature is warm the evaporator is configured to catch the water vapor inside of air and convert the water vapor into liquid water, wherein the liquid water falls from the evaporator to a bottom water tank; when the environment's temperature is cold, and the dew point is near, or lower than, 0° C. the external surface temperature of the evaporator is lower than the dew point or 0° C., the evaporator is configured to catch the water vapor inside of air and convert the water vapor into liquid water, then freezing the liquid water into frost, for about 20 minutes;
   a bypass shunt directing refrigerant from the compressor to the evaporator without passing through the expansion device, whereby the external surface of the evaporator is warm relative to the ambient temperature when refrigerant is received from the bypass shunt;
   at least one bypass valve located on the bypass shunt controlling whether refrigerant flows through the bypass shunt;
   a frost sensor that detects frost accumulation on the external surface of the evaporator;
   a controller that receives input from the frost sensor and opens the bypass valve in response to the frost sensor detecting frost accumulation on the external surface of the evaporator;
   a collection vessel located below the evaporator which collects liquid water and melted ice falling from the evaporator, thereby collecting atmospheric moisture;
   an ambient humidity sensor configured to measure the relative humidity of the ambient air;
   wherein the compressor has a variable frequency, the variable frequency configured to control the compression of refrigerant delivered from the condenser to the evaporator;
   a regulator configured to control the variable frequency of the compressor, thereby modifying the external temperature of the evaporator;
   wherein the regulator is configured to receive input from the ambient humidity sensor; and
   wherein the regulator is configured to lower the evaporator temperature to less than 0 degree C. when the ambient humidity sensor measures an ambient humidity below a threshold value.

2. The system of claim 1, wherein the system further comprises an ambient temperature sensor measuring the temperature of the ambient air; and:

wherein the expansion device has a variable aperture, the variable aperture controlling the flow rate of refrigerant from the condenser to the evaporator;

wherein the system further comprises a regulator receiving input from the ambient temperature sensor and controlling the variable aperture of the expansion device, thereby modifying the external temperature of the evaporator, wherein the regulator lowers the evaporator temperature to less than 0 degree C. when the ambient temperature sensor measures an ambient air temperature below a threshold value.

3. The system of claim 2, wherein said threshold value for ambient air temperatures is less than 15 degrees C.

4. The system of claim 1, wherein the expansion device has a variable aperture, the variable aperture controlling the flow rate of refrigerant from the condenser to the evaporator;

wherein the system further comprises a regulator controlling the variable aperture of the expansion device, thereby modifying the external temperature of the evaporator;

wherein the regulator receives input from the ambient humidity sensor;

wherein the regulator lowers the evaporator temperature to less than 0 degree C. when the ambient humidity sensor measures ambient humidity below a threshold value.

5. The system of claim 4, wherein said threshold value for ambient humidity is less than 40%.

6. The system of 1, wherein the system is ruggedized for use in harsh environments by further comprising:

filter housings comprising stainless steel;

a vibration insensitive controller; and an exterior casing impervious to pests and precipitation.

7. The system of claim 2, wherein said threshold value for ambient air temperature is less than 10 degrees C.

8. The system of claim 4, wherein low ambient humidity is assigned a value wherein relative humidity is less than 30%.

9. A method of collecting atmospheric water in a system having a compressor to compress a refrigerant; a first heat exchanger and a second heat exchanger disposed along a refrigerant flow path, wherein at a first point in time the first heat exchanger functions as a condenser, the condenser receiving hot refrigerant from the compressor, wherein the condenser exchanges heat so as to cool the refrigerant moving along the flow path; an expansion device comprising an expansion valve and capillary device disposed along the refrigerant flow path between the first heat exchanger and a second heat exchanger, receiving refrigerant from the condenser, wherein the expansion device adjusts a pressure of the refrigerant; wherein at the first point in time the second heat exchanger functions as an evaporator, the evaporator receiving refrigerant from the expansion device and delivering refrigerant along the flow path the compressor, wherein the evaporator exchanges heat and the refrigerant inside the evaporator absorbs heat, whereby an external surface of the evaporator is cold relative to an ambient temperature when refrigerant is received from the expansion device, and wherein the temperature of the external surface of the evaporator is maintained at less than 0 degree C. for periods exceeding 20 minutes so as to promote the accumulation of frost; at least one flow-directing valve disposed alone the refrigerant flow path; wherein at the first point in time, the flow-directing valve is in a first configuration; wherein the first configuration of the flow-directing valve directs refrigerant from the second heat exchanger to the compressor, and directs refrigerant from the compressor to the first heat exchanger; wherein at a second point in time, the flow-directing valve is in a second configuration; wherein the second configuration of the flow-directing valve directs refrigerant from the first heat exchanger to the compressor, and directs refrigerant from the compressor to the second heat exchanger, whereby at the second point in time the first heat exchanger functions as the evaporator and the second heat exchanger functions as the condenser; a collection vessel located below the first heat exchanger and below the second heat exchanger which collects liquid water and melted ice falling from the first heat exchanger and the second heat exchanger; wherein the compressor has a variable frequency, the variable frequency controlling the compression of refrigerant delivered from the condenser to the evaporator; wherein the system further comprises a regulator controlling the variable frequency of the compressor, thereby modifying the external temperature of the evaporator; the method comprising the steps of:

running the compressor so that refrigerant circulates along the refrigerant flow path;

switching the flow-directing valve from the first configuration to the second configuration;

continuing to run the compressor so that refrigerant circulates along the refrigerant flow path for a period of time;

thereafter, restoring the flow-directing valve from the second configuration to the first configuration;

collecting water falling into the collection vessel, thereby collecting atmospheric moisture; and modifying the external temperature of the evaporator so as to reach a temperature below 0 degrees C. when an ambient humidity sensor measures an ambient humidity below a threshold value.

10. The method of claim 9, wherein the period of time is between 20 minutes and 30 minutes.

11. A method of collecting atmospheric water in a system having a compressor to compress a refrigerant; a first heat exchanger and a second heat exchanger disposed along a refrigerant flow path, wherein at a first point in time the first heat exchanger functions as a condenser, the condenser receiving hot refrigerant from the compressor, wherein the condenser exchanges heat so as to cool the refrigerant moving along the flow path; an expansion device comprising an expansion valve and capillary device disposed along the refrigerant flow path between the first heat exchanger and a second heat exchanger, receiving refrigerant from the condenser, wherein the expansion device adjusts a pressure of the refrigerant; wherein at the first point in time the second heat exchanger functions as an evaporator, the evaporator receiving refrigerant from the expansion device and delivering refrigerant along the flow path to the compressor, wherein the evaporator exchanges heat and the refrigerant inside the evaporator absorbs heat, whereby an external surface of the evaporator is cold relative to an ambient temperature when refrigerant is received from the expansion device, and wherein the temperature of the external surface of the evaporator is maintained at less than 0 degree C. for periods exceeding 20 minutes so as to promote the accumulation of frost; at least one flow-directing, valve disposed along the refrigerant flow path; wherein at the first point in time, the flow-directing valve is in a first configuration; wherein the first configuration of the flow-directing valve directs refrigerant from the second heat exchanger to the compressor, and directs refrigerant from the compressor to the first heat exchanger; wherein at a second point in time, the flow-directing valve is in a second configuration; wherein the second configuration of the flow-directing valve directs refrigerant from the first heat exchanger to the compressor, and directs refrigerant from the compressor to the second heat exchanger, whereby at the second point in time the first heat exchanger functions as the evaporator and the second heat exchanger functions as the condenser; a collection vessel located below the first heat exchanger and below the second heat exchanger which collects liquid water and melted ice falling from the first heat exchanger and the second heat exchanger; an inflow air sensor measuring at least one of: the relative humidity of the inflow air and the temperature of the inflow air; wherein the compressor has a variable frequency, the variable frequency controlling the compression of refrigerant delivered from the condenser to the evaporator;

wherein the system further comprises a regulator controlling the variable frequency of the compressor, thereby modifying the external temperature of the evaporator;

wherein the regulator receives the relative humidity as an input from the inflow air sensor; and wherein the regulator lowers the evaporator temperature to less than 0 degree C. when the inflow air sensor measures low ambient humidity, the method comprising the steps of:

running the compressor so that refrigerant circulates along the refrigerant flow path;

switching the flow-directing valve from the first configuration to the second configuration;

continuing to run the compressor so that refrigerant circulates along the refrigerant flow path for a period of time;

modifying the external temperature of the evaporator so as to reach a temperature below 0 degrees C. when the inflow air sensor measures an ambient humidity below a threshold value;

thereafter, restoring the flow-directing valve from the second configuration to the first configuration; and collecting water falling into the collection vessel, thereby collecting atmospheric moisture.

12. A system for collecting atmospheric moisture comprising:

a compressor to compress a refrigerant;

a first heat exchanger and a second heat exchanger disposed along a refrigerant flow path, wherein at a first point in time the first heat exchanger functions as a condenser, the condenser receiving hot refrigerant from the compressor, wherein the condenser exchanges heat so as to cool the refrigerant moving along the flow path;

an expansion device comprising an expansion valve and capillary device disposed along the refrigerant flow path between the first heat exchanger and a second heat exchanger, receiving refrigerant from the condenser, wherein the expansion device adjusts a pressure of the refrigerant;

wherein at the first point in time the second heat exchanger functions as an evaporator, the evaporator receiving refrigerant from the expansion device and delivering refrigerant along the flow path to the compressor, wherein the evaporator exchanges heat and the refrigerant inside the evaporator absorbs heat, whereby an external surface of the evaporator is cold relative to an ambient temperature when refrigerant is received from the expansion device, and wherein the temperature of the external surface of the evaporator is maintained at less than 0 degree C. for periods exceeding 20 minutes so as to promote the accumulation of frost;

at least one flow-directing valve disposed along the refrigerant flow path;

wherein at the first point in time, the flow-directing valve is in a first configuration;

wherein the first configuration of the flow-directing valve directs refrigerant from the second heat exchanger to the compressor, and directs refrigerant from the compressor to the first heat exchanger;

wherein at a second point in time, the flow-directing valve is in a second configuration;

wherein the second configuration of the flow-directing valve directs refrigerant from the first heat exchanger to the compressor, and directs refrigerant from the compressor to the second heat exchanger, whereby at the second point in time the first heat exchanger functions as the evaporator and the second heat exchanger functions as the condenser;

a collection vessel located below the first heat exchanger and below the second heat exchanger which collects liquid water falling from the evaporator, thereby collecting atmospheric moisture;

an ambient humidity sensor configured to measure the relative humidity of the ambient air;

wherein the compressor has a variable frequency, the variable frequency configured to control the compression of refrigerant delivered from the condenser to the evaporator;

a regulator configured to control the variable frequency of the compressor, thereby modifying the external temperature of the evaporator;

wherein the regulator is configured to receive input from the ambient humidity sensor; and wherein the regulator is configured to lower the evaporator temperature to less than 0 degree C. when the ambient humidity sensor measures an ambient humidity below a threshold value.

13. The system of claim 12 further comprising:

a frost sensor that detects frost accumulation on the external surface of either heat exchanger; and a controller that receives input from the frost sensor and controls the flow-directing valve to switch between the first configuration and the second configuration in response to the frost sensor detecting frost accumulation.

14. The system of claim 12, wherein the temperature of the external surface of the evaporator is maintained at less than 0 degree C. for periods exceeding 20 minutes so as to promote the accumulation of frost.

15. The system of claim 12, wherein the external surface of the evaporator is maintained at less than −2 degrees C. for periods exceeding 20 minutes so as to promote the accumulation of frost.

* * * * *